Patented Mar. 16, 1954

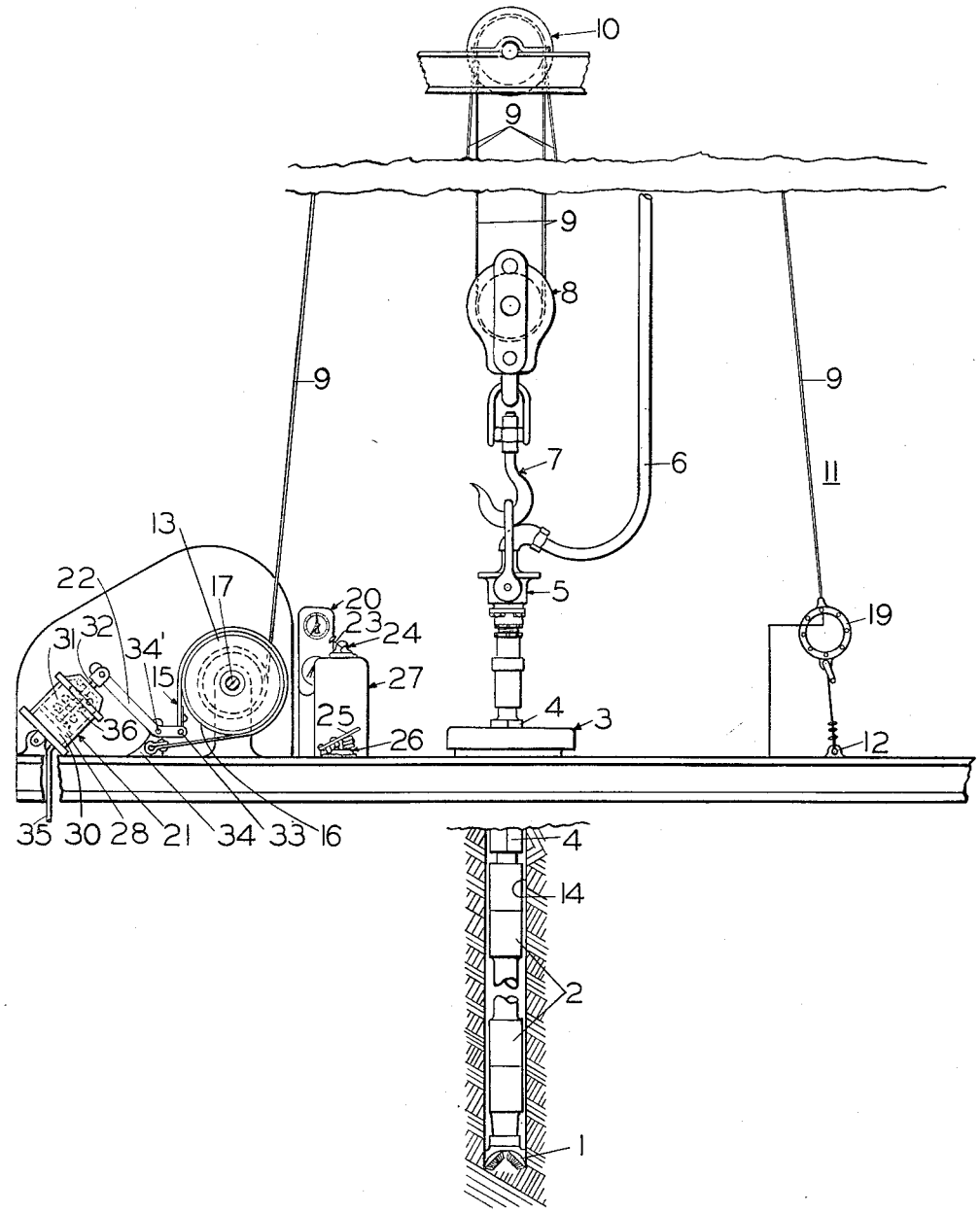

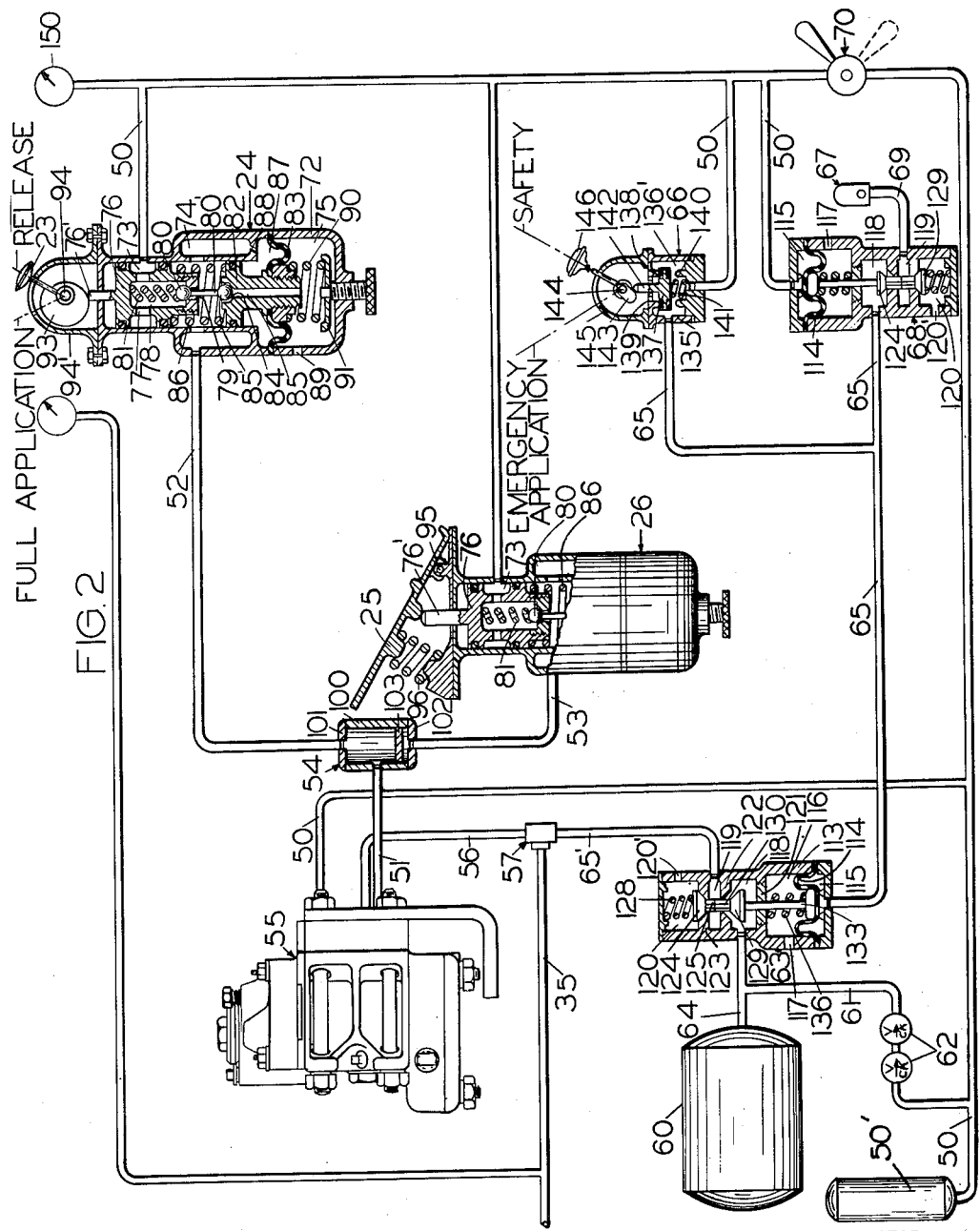

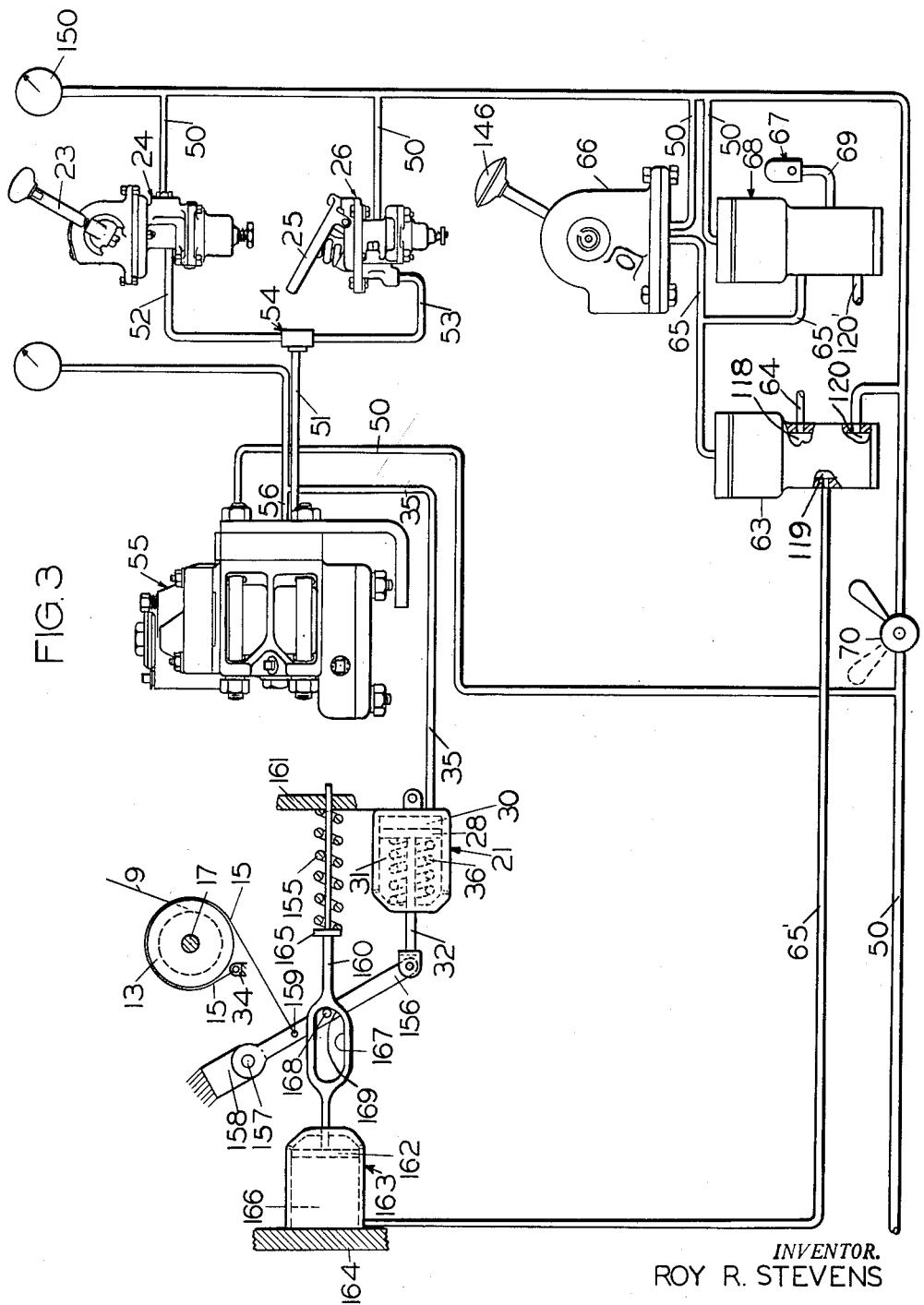

2,672,222

UNITED STATES PATENT OFFICE 2,672,222

FLUID PRESSURE CONTROL APPARATUS FOR ROTARY WELL DRILLING EQUIPMENT

Roy R. Stevens, Forest Hills, Pa., assignor to Westinghouse Air Brake Company, a corporation of Pennsylvania Application June 5, 1948, Serial No. 31,365

2 Claims. (Cl. 188—151)

1

This invention relates to control apparatus for rotary well drilling equipment and more particularly to the fluid pressure type.

As a rotary bit secured to the lower end of a column of drill pipe is rotated against a formation on the bottom of a hole in drilling a well, its effect varies with the amount of pressure applied by said bit onto said formation. If pressure on the bit is insufficient, the bit may slide or drag over the formation face ineffectively and cause undue wear on the bit. If pressure on the bit is excessive, the bit may embed itself in the formation to such an extent that, in an effort to cut itself free, it will chatter up and down as it revolves, thus causing undue wear and strain on the drilling equipment which may result in premature failure of parts thereof. For a given formation and a given speed of rotation of a particular bit, a proper bit pressure may be chosen that will give best results.

The driller, in operating the conventional rotary drilling equipment in a well-known manner, intermittently releases a mechanical brake on the hoisting drum for a short interval to allow supporting cable to intermittently feed from said drum for effecting periodic increases in bit pressure as the desired bit pressure works off. Dependent upon the attention of the driller, such intermittent feeding results in excessive fluctuations in bit pressure, resulting in erratic and inefficient drilling operation, and it is therefore a prime object of the invention to provide means in the form of fluid pressure control apparatus for controlling operation of the brake on the hoisting drum in such a manner as will eliminate undesired fluctuations in bit pressure.

The present invention takes advantage of the extreme accuracy with which graduations in brake application force may be effected by means of fluid pressure brake apparatus. By provision of a hand operated fluid pressure valve device of the self-lapping type, variations in pressure of fluid in a brake cylinder device operatively connected to a brake on the draw works hoisting drum may be effected and maintained for accurately controlling the degree of application of said brake. Consequently, feed of the supporting cable from the hoisting drum during drilling may be accurately controlled and in such a manner that said feed may be substantially constant rather than intermittent, with the result that a substantially constant pressure on the drilling bit may be maintained without necessity for numerous feed re-adjustments by the driller whose attention then may be directed elsewhere.

2

During operations involving running drill pipe and/or casing, etc., in and out of the hole, a foot operated valve device is provided in the fluid pressure control apparatus for controlling operation of the draw works hoisting drum brake, while leaving the driller's hands free for manipulating shift levers or the like. The foot operated valve device and the hand operated valve device are arranged in parallel, so that, if desired, the driller may remove his foot from the foot operated valve, which will return to brake release position, yet maintain the draw works drum brake applied by positioning the hand operated valve device.

The invention further provides the fluid pressure control apparatus with novel emergency means for effecting either automatic or intentional emergency application of the brake on the draw works hoisting drum in event of accidental loss in pressure of fluid in the normal source of supply of fluid under pressure for said apparatus. The emergency means comprises audible signal means, automatically operative upon a certain undesired reduction in the normal supply pressure to sound an alarm for warning the driller of such condition.

Other objects and advantages will be apparent from the following more detailed description of the invention taken in connection with the accompanying drawings, in which:

Fig. 1 is an elevation view of parts of a rotary drilling rig equipment embodying the invention;

Fig. 2 is a schematic layout, partly in outline and partly in section, of the control apparatus for the drilling rig equipment; and Fig. 3 is a schematic layout substantially in outline of an alternate control apparatus for the drilling rig equipment.

Description

Referring to Fig. 1 in the drawings, the usual rotary oil or gas well drilling equipment comprises the rotary bit 1 attached to the lower end of the column of drill pipe 2 which is adapted to be rotated by the rotary table 3 through the grief stem 4. The lower end of grief stem 4 is attached to the upper end of the string of drill pipe, while the upper end of said grief stem is carried by the swivel 5. The swivel 5 allows for rotation of grief stem, drill pipe, and bit suspended thereby and also serves as a connector for the flexible mud line 6 through which drilling mud is pumped for supply to the bit. The swivel 5 is carried by the casing hook 7 which is in turn carried by the traveling block 8. The traveling block 8 is carried by the supporting cable 9 strung between the traveling block and the crown block 10 at the top of the derrick (not shown). The dead line 11 of the supporting cable 9 is anchored, as at 12, to a fixed element, while the opposite end of the cable is wound onto the drawworks hoisting drum 13.

In the well-known manner, during drilling operation with the rotary rig, as the rotary table 3 is rotated by means (not shown), the weight of drill pipe 2 allowed to be exerted by the bit 1 on the bottom of the hole 14 is determined by feed of the cable 9 from the drum 13 which is controlled through operation of a band brake 15 which cooperates with a brake drum 16 secured for rotation with the hoisting drum 13 about a central shaft 17. The usual Martin-Decker type of weight indicator 19 and gauge 20 serves as means whereby the driller or operator of the rig may determine the bit pressure.

According to the principal feature of the invention, I provide a fluid pressure brake cylinder device 21 operatively connected through a lever 22 to the band brake 15. Brake cylinder device 21 is operable by fluid the pressure of which may be controlled by positioning of an operator's handle 23 on a self-lapping control valve device 24 or by positioning of a foot pedal 25 on a self-lapping control valve device 26. Both control valve devices 24, 26 may be mounted on a control stand 27 of light construction which may be moved to any location convenient for the operator, which location might be that in which it is shown in Fig. 1, adjacent to the draw works drum.

The brake cylinder device 21 may be of the usual construction comprising a hollow cylindrical casing having a piston 28 slidably disposed therein and dividing the interior thereof into a pressure chamber 30 and an atmospheric chamber 31. A piston rod 32 operatively connects piston 28 with one end of lever 22 the opposite end of which is pivotally connected at 33 to one end of brake band 15. The opposite end of band 15 may be pivotally connected to a fixed element 34. A brake cylinder pipe 35 is provided for conveying fluid under pressure to and from the pressure chamber 30, and a piston return spring 36 is disposed in chamber 31.

In operation of the brake cylinder device 21, when fluid under pressure is supplied to pressure chamber 30 piston 28 will move in the direction of chamber 31 against opposing action of spring 36, causing lever 22 to be rocked about a fixed pivot point 34' and bring brake band 15 into contact with drum 16, whereupon further movement of piston 28 will cease and a braking force will be applied by said band on drum 16 substantially in proportion to the degree of pressure of fluid in chamber 30. Upon release of fluid under pressure from the chamber 30 in brake cylinder device 21, the return spring 36 will return piston 29, lever 22 and brake band 15 to a normal rest or brake release position in which position they are shown in Fig. 1 in the drawings.

*Description Fig. 2*

Referring to Fig. 2 in the drawings, the preferred form of the fluid pressure control apparatus comprises the self-lapping control valve devices 24, 26 which are operable to effect supply of fluid under pressure from a normal fluid pressure supply pipe 50, common to both, to a control line 51 and to effect release of fluid under pressure therefrom. Delivery from devices 24, 26 is conveyed to control line 51 via respective pipes 52, 53 which are connected to opposite inlets of a double check valve device 54, the outlet of which connects to line 51, for reasons which will become obvious. Control line 51 is connected to a relay valve device 55 which is operable in response to pressure of fluid in control line 51 to effect supply of fluid at control line pressure from a branch of supply pipe 50 to the brake cylinder pipe 35 via a pipe 56 and a double check valve device 57. Relay valve device 55 may be located adjacent to the brake cylinder device 21, so that the size and capacity of valve devices 24, 26 and pipes 52, 53 may be considerably reduced over that which may otherwise be required were these required to handle fluid for direct supply to the brake cylinder 21. It will be appreciated, however, that pipe 51 might be connected to pipe 56 and valve device 55 eliminated insofar as the principle of operation of the control apparatus is concerned.

An emergency protection portion is incorporated in the control apparatus to assure an automatic emergency application of the hoisting drum brake in event of accidental undesired reduction in pressure of fluid in the normal supply pipe 50. The protection portion comprises an emergency reservoir 60 adapted to be charged with fluid under pressure from supply pipe 50 via a pipe 61, two check valve devices 62, arranged therein in series, and a pipe 64. A relay valve device 63 is arranged to control release of fluid under pressure from the emergency reservoir 60 via pipe 64 to double check valve device 57 via a pipe 65' for supply to brake cylinder pipe 35 to effect a brake application. A control pipe 65 is connected to the relay valve device 63 to convey fluid under pressure to and from said device for controlling its operation. A two position control valve device 66 is provided which in one position is arranged to connect pipe 50 to pipe 65 and in its other position to connect pipe 65 to atmosphere. Signal means in the form of a whistle 67 is provided for effecting an audible signal when fluid in the normal supply pipe 50 falls below a certain pressure. A relay valve device 68, similar to relay valve device 63, is arranged to be controlled by pressure of fluid in pipe 50 for controlling communication between pipe 65 and a pipe 69 connected to the whistle 67. A normally open cock 70 is inserted in supply pipe 50 which is operable to a closed position for cutting off supply of fluid under pressure from the normal source (pipe 50) to the control apparatus should repair or service to said apparatus be required.

Referring to Fig. 2, the self-lapped control valve device 24 may comprise a casing 72 having a fluid pressure supply chamber 73, a delivery chamber 74, and an exhaust chamber 75 therein. A supply valve seat element 76, attached to an operating stem 76' is adapted for reciprocable movement within the casing 72. Element 76 is open intermediate its ends to the supply chamber 73 by way of ports 77 and a central cavity 78, and at its lower end, as viewed in the drawing, to the delivery chamber 74 by way of a supply valve seat 79. A supply valve 80 in the form of a ball may be disposed within cavity 78 for controlling communication between the supply chamber 73 and the delivery chamber 74. A bias spring 81 is disposed in the cavity 78 arranged to urge the valve 80 toward a normally closed position on seat 79. An exhaust valve seat element 82, secured for reciprocable movement with deflection of a diaphragm 83, is open at one end to the delivery chamber 74 and has an exhaust valve seat 84 formed therein. Valve seat element 82 extends through the diaphragm 83 with its opposite end disposed in the exhaust chamber 75 and has a central opening 85 extending from end to end and through the valve seat 84 at the one end. An exhaust valve 85', connected to the supply valve 80 by a pin 80', also in the form of a ball is disposed in delivery chamber 74 to cooperate with the seat 84 in element 82 for controlling communication via opening 85 between said delivery chamber and the exhaust chamber 75. A bias spring 86, disposed in the delivery chamber 74, is interposed between seat elements 76, 82 for biasing the seat element 76 in the direction of chamber 73. The diaphragm 83 is subject on one side to pressure of fluid in a diaphragm chamber 87, which pressure of fluid is that of the delivery chamber 74, the two chambers being connected one with the other by way of a choke 88. The opposite side of the diaphragm 83 is exposed to atmosphere by way of a port 89 in the casing. A compression control spring 90 is disposed in the exhaust chamber 75, interposed between the diaphragm and an adjustable spring seat element 91, for determining the degree of deflection of said diaphragm for any given pressure condition in the delivery chamber 74. The adjustable spring seat 91 is provided to allow for changing the pre-compression of the control spring 90.

For effecting adjustment of the stem 76', a cam 93 is provided arranged for turning movement about a fixed shaft 94 by positioning of the operator's handle 23 which is secured to said cam. Cam 93 is disposed within a hollow cover cap 94' attached to the top of casing 72. Handle 23 projects outwardly through a slot in cap 94', and opposite ends of said slot may define extreme stop limits for travel of said handle within said slot.

The cam 93 is so shaped that as handle 23 is rocked from a "Release" position, in which it is shown in the drawing, to or toward a "Full Application" position, stem 76' in device 24 may be displaced inwardly of casing 72 increasing distances in proportion to degree of movement of said handle.

The self-lapping control valve device 26 is substantially similar to the self-lapping control valve device 24, with the exception that position of stem 76' in device 26 is adjusted by means of the foot pedal 25, rather than handle 23 and the cam 95 in device 24. Pedal 25 is arranged for pivotal movement about a fixed pin 95 and is biased toward a normal rest position, in which position it is shown in the drawing, by means of a compression spring 96. As pedal 25 is caused to rock in a counter-clockwise direction about pin 95, stem 76' of device 26 is displaced inwardly of its casing according to degree of the rocking movement of said pedal.

In operation of the self-lapping valve devices 24, 26, when stem 76' is moved inwardly of the casing 72 a certain distance, the attached seat element 76 is moved downwardly, as viewed in the drawing, while the supply valve seat 79 formed in the end of element 76 is moved away from the supply valve 80. At this time, supply valve 80 will remain stationary due to seating engagement of the attached exhaust valve 85' on seat 84 of element 82. After the supply valve seat 79 moves away from the supply valve 80, supply chamber 73 is opened to delivery chamber 74 by way of ports 77, cavity 78 and seat 79. Fluid under pressure from supply pipe 50 connected to supply chamber 73 will then flow into the delivery chamber 74 where the pressure of fluid will thus be caused to increase. Pressure of fluid in diaphragm chamber 87 open to chamber 74, being greater than the atmospheric pressure in chamber 75, will deflect diaphragm 83 against action of spring 90 in the direction of the last mentioned chamber. Deflection of diaphragm 83 will carry the exhaust valve seat element 82 with it. Bias spring 81 will cause the supply valve 80 and exhaust valve 85' to follow movement of element 82, while said exhaust valve remains seated on seat 84 in the end of said element, until said supply valve seats on seat 79 in element 76. Upon seating of the supply valve 80, the supply chamber 73 is closed to the delivery chamber 74 and further increase in pressure in the latter chamber thereby will be prevented. In absence of further increase in delivery pressure in the diaphragm chamber 87, the pressure force on its one side will balance with the spring force on its opposite side and further deflection of said diaphragm will cease. The supply valve 80 and the exhaust valve 85' will remain seated. If, at this time, stem 76' were moved inwardly a greater amount, element 76 would again be moved downwardly to unseat from the supply valve 80, and the above described action would repeat, and an increase in pressure of fluid would be secured in the delivery chamber 74. The pressure of fluid thus obtained in the delivery chamber 74 will vary in substantial proportion to the degree of inward movement of the operating stem 76'. The minimum pressure which will be held in the delivery chamber 74 will depend on the degree of pre-compression of the control spring 90, which precompression may be changed by adjustment of the spring seat element 91.

If, subsequently, the operating stem 76', is allowed to be moved outwardly of casing 72 by action of spring 86 to a more extended position, the supply valve 80 and attached exhaust valve 85' will be carried with it. The exhaust valve 85 is thus unseated from seat 84 in element 82, and the delivery chamber 74 is thereby opened by way of opening 85 in said element to the exhaust chamber 75. Delivery pressure in chamber 74 is thus caused to reduce, and such reduction, reflected in the diaphragm chamber 87, allows the control spring 90 to deflect the diaphragm 83 upwardly. Upward deflection of the diaphragm 83 carries the element 82 into engagement with the exhaust valve 85'. The delivery chamber 74 is thus closed off from the exhaust chamber 75 and further reduction in delivery pressure thereby will be prevented. Under such condition, the diaphragm 83 ceases further deflection, and both the supply valve 80 and the exhaust valve 85' remain seated. A reduced delivery pressure, determined by position of the operating stem 76', is thus secured.

Summarizing action of the self-lapping valve devices 24, 26, it will be seen that with the proper adjustment of the spring 90, and with fluid at adequate pressure in chamber 73, the pressure of fluid in the delivery chamber 74 is determined by position of element 76 as adjusted through positioning of stem 76'. By effecting displacement of stem 76' inwardly of the casing 72, pressure of fluid in delivery chamber 74 will be increased in amount proportional to the degree of said displacement. Conversely, as outward movement of stem 76' is effected, the pressure of fluid in the delivery chamber 74 will be decreased in amount proportional to degree of said outward movement.

In both valved devices 24, 26 a certain outermost limit position of the stems 76' is defined by rest positions of cam 93 and foot pedal 25, respectively. The outermost limit position of stem 76' in devices 24, 26 corresponds to a certain minimum pressure in delivery chamber 74. Maximum inward displacement of stem 76' calls for maximum delivery pressure. Still further, both the valved device 24, and the valve device 26 is self-maintaining, i. e., any tendency for increase or decrease in pressure of fluid in delivery chamber 74 out of accord with position of stem 76' is automatically compensated for to prevent such occurrence in manner as aforedescribed.

Delivery chamber 74 in the self-lapping control valve device 24 is connected to the pipe 52, and delivery chamber 74 in the self-lapping control valve device 26 is connected to the pipe 53. The double check valve device 54 may be of any suitable type such as is shown in the drawing comprising a hollow cylindrical casing 100 closed at opposite ends by cap members 101, 102 through which pipes 52, 53 are connected, respectively, opening into opposite ends of said casing. Line 51 is connected to a radial opening in casing 100 equi-distant opposite ends thereof. A piston valve element 103 is slidably mounted within casing 100 and is subject opposingly to pressure of fluid in pipe 52 on its one side and to pressure of fluid in pipe 53 on its opposite side. In the well-known manner, preponderance of pressure in one of the two pipes 52, 53 will cause piston valve element 103 at one side of line 51 to move in the direction of the other of the two pipes to open the pipe 51 via the interior of casing 100 to the pipe with the preponderance of pressure.

The relay valved evice 55, shown in outline, may be similar to the fluid pressure valve device disclosed and described in detail in United States Letters Patent No. 2,096,491, issued to Ellis E. Hewitt, October 19, 1937, and assigned to the assignee of the present application. For description such a relay valve device reference may be made to the above named Letters Patent. Briefly, device 55 is operative upon supply of fluid to line 51 to effect supply of fluid from pipe 50 to pipe 56 at a pressure substantially equal to pressure of the fluid in line 51, but such supply will be of sufficient quantity to operate brake cylinder device 21 in being supplied thereto via pipe 35. Device 55, briefly, will respond to variations in pressure in line 51 to effect corresponding variations in pressure of fluid in pipe 56, 35 and brake cylinder device 21 connected thereto.

Check valves 62 may be of any suitable construction and they serve to allow flow of fluid under pressure from supply pipe 50 to pipe 64, but prevent back flow of fluid under pressure in the opposite direction. Two of these check valves, rather than only one, are provided arranged in series as an added assurance that back flow will not occur due to leakage.

The relay valve devices 63, 68 may comprise a casing 113 having a diaphragm 114 disposed therein and subject to pressure of fluid in a diaphragm chamber 115 on one side and to pressure of fluid in a chamber 116 on its opposite side, which latter chamber is open to atmosphere via a port 117 in the casing. Also formed in the casing are chambers 118, 119 and 120, chamber 118 being separated from chamber 116 by a partition 121 and from chamber 119 by a partition 122. A partition 123 separates chambers 119, 120. A supply valve 124 is disposed in chamber 120 for controlling communication between said chamber and the chamber 119. Valve 124 may be secured to a fluted stem 125 slidably mounted in a suitable bore extending through the partition 123, a seat being formed in one end of said bore to accommodate said valve. A bias spring 128 is disposed in chamber 120, arranged to urge the valve 124 in the direction of its seat. A release valve 129, similar to valve 124, is disposed in chamber 118 for controlling communication between said chamber 118 and the chamber 119. For slidably guiding valve 129, a fluted stem 130 is provided which is slidably disposed in a suitable bore opening through partition 122. A valve seat is formed in partition 122 for accommodating the valve 129. Stems 125, 130 project into and meet in the chamber 119 in such a manner that action of bias spring 128 on valve 124, in urging same in the direction of its seat, at the same time, through said stems, urges valve 129 in a direction away from its respective seat. If valve 129 is seated, valve 124, consequently, will be unseated. Valve 129 is operably connected to the diaphragm 114 by means of a rod or stem 133 extending therebetween through a bore in partition 121 in which said rod is slidably disposed. A control spring 136 is provided in chamber 116, arranged to oppose deflection of the diaphragm 114 in the direction of chamber 118 as caused by pressure of fluid in chamber 115 for determining the degree of said pressure necessary for effecting operation of valves 124, 129.

In operation, the relay valve device 63 and the relay valve device 68 will respond to a certain pressure of fluid in the diaphragm chamber 115 to close valve 129 and open valve 124 to connect the chamber 119 to chamber 120 hence to atmosphere via a port 120'. Upon a subsequent certain reduction in pressure of fluid in diaphragm chamber 115, relay valve devices 63, 68 will respond to close valve 124 and to open valve 129 to connect chamber 118 to chamber 119.

In relay valve device 63, chamber 118 is connected to pipe 64, chamber 119 to pipe 65' and diaphragm chamber 115 to pipe 65.

In relay valve device 68, chamber 118 is connected to pipe 65, chamber 119 to pipe 69 and diaphragm chamber 115 to pipe 50.

The two position control valve device 66 may comprise a casing 135' having a delivery chamber 136' formed therein. Chamber 136' is constantly open to pipe 65. A double acting valve element 137 is disposed in chamber 136' and is operable to one position, in which it is shown in the drawing, to cooperate with a seat 138 to close said chamber to an atmospheric port 139 while said chamber remains open to pipe 59, and operable to another position away from seat 138 to an oppositely disposed seat 140 for closing off pipe 50 from chamber 136' and opening said chamber to atmosphere via port 139. A spring 141 is arranged to urge valve element 137 toward seat 138, and an attached stem 142 and cam 143 are arranged so that as said cam is rocked in a counter-clockwise direction about a fixed pin 144, as viewed in the drawing, said valve element is displaced through slidable movement of said stem to its other position in sealing engagement with seat 140. Cam 143 may be disposed within a hollow cap member 145 secured to the top of casing 135 to which pin 144 is attached at its opposite ends. An operator's handle 146 is attached to cam 143 for rocking same. Handle 146 may project outwardly through a slot in cap member 145 to render said handle accessible, while opposite ends of said slot may serve as stop limits to define the two opposite "Safety" and "Emergency Application" positions of the valve device, respectively, indicated by dot and dash lines in the drawing and so titled.

In operation of valve device 66, in "Safety" position of handle 146, in which position it is shown in the drawing, pipe 65 is connected to supply pipe 50, and in "Emergency Application" position, said pipe 65 is connected to atmosphere.

*Operation employing control apparatus shown in Fig. 2*

Referring to Figs. 1, 2 in operation of the rotary rig assume that the column of drill pipe 2 and bit 1 are being run into the hole 14 preparatory to drilling. Assume further that in the control apparatus shown in Fig. 2 the control supply pipe 50 is charged with fluid under pressure from a suitable source such as a supply reservoir 50', handle 146 of valve device 66 is in "Safety" position with pipe 65 consequently connected to supply pipe 50. Relay valve device 63 will be positioned in response to pressure of fluid in pipe 65 to cut off pipe 64 from pipe 65' which latter pipe will be vented to atmosphere, while relay valve device 68 will be positioned, in response to pressure of fluid in pipe 50, to cut off pipe 65 from pipe 69 which is open to atmosphere through whistle 67.

By manipulation of either the handle 23 in valve device 24 or foot pedal 25 in valve device 26, pressure of fluid supplied to the brake cylinder device 21 via relay valve device 55 is regulated to control rate of descent of the drill pipe 2 and bit 1 through control of braking on the hoisting drum 13. While the bit 1 is yet off the bottom of the hole 14, the operator or driller will note the total weight suspended by the supporting cable 9 by observing the weight indicator dial 20. When the bit 1 rests on bottom, it will begin to support part of the weight of the drill pipe 2, which weight will be subtracted from the weight carried by the supporting cable 9, indicated to the driller by a shift in position of the needle on the indicator dial 20. The rotary table 3 will then be brought into operation to rotate the drill pipe 2, hence the bit 1 on bottom to make hole. Through adjustment of position of handle 23 in the self-lapping control valve device 24, the degree of pressure provided in brake cylinder device 21, hence the degree of brake application on the draw works hoisting drum 13, and hence feed of the cable 9 from said drum may be so regulated that the pressure exerted by the bit 1 on the bottom of the hole 14 as said bit drills through the formation may be maintained substantially constant, with little or no attention required by the driller.

For sake of convenience, where intermittent operation of the brakes on the draw works hoisting drum is required, as in making up and breaking joints in running drill pipe or casing in and out of the hole, for example, the foot operated self-lapping control valve device 26 may be employed by the driller, thus leaving both hands free to manipulate, clutch controls, speed controls, or the like, although, if desired, the control valve device 24 may be employed for this purpose.

It may be convenient for the driller to employ the hand operated self-lapping control valve device 24 and the foot operated self-lapping control valve device 26 together. The control valve device 24 may be set, by positioning handle 23, for a certain brake cylinder pressure to give restraining action to the hoisting drum as successive stands of drill pipe are run into the hole, for example, while stops at the end of travel could be effected through operation of the foot operated self-lapping control valve device 26 to effect an increase in brake cylinder pressure above that set by said control valve device 24.

Assume that normally the pressure of fluid in the control supply pipe 50 will vary in a range between one hundred twenty pounds and one hundred fifty pounds, as might be the usual case were said pipe connected to a reservoir supplied by a compressor controlled by a pressure governor, wherein the governor would automatically start the compressor when pressure in the reservoir fell to one hundred twenty pounds and automatically stop the compressor when reservoir pressure reached one hundred fifty pounds.

Now assume that pressure of fluid in the control supply pipe 50 drops below one hundred twenty pounds, due to failure of the compressor to operate, for example. When such pressure reaches some value such as one hundred ten pounds, such reduced pressure, reflected in the diaphragm chamber of relay valve device 68 will render said device responsive to connect the pipe 65 to the pipe 69. Fluid under pressure from supply pipe 50 will flow through valve device 66, which is normally in its "Safety" position, through the branches of pipe 65, through relay valve device 68 and pipe 69 and into whistle 67 to sound same and thereby indicate to the driller that supply pressure is below normal. The driller may then effect an intentional emergency application of brakes on the draw works hoisting drum 13 by moving handle 146 on valve device 66 to "Emergency Application" position to thereby cut off supply pipe 50 from pipe 65 and to connect the latter pipe to atmosphere. Fluid under pressure from diaphragm chamber 115 in relay valve device 63 will now flow to atmosphere via pipe 65 and valve device 66, and when pressure of fluid in said pipe is completely exhausted, the whistle 67 connected thereto will stop sounding. In response to venting fluid under pressure from its diaphragm chamber 115, the relay valve device 63 will however, assume the position for connecting pipe 64 to pipe 65', at which time, fluid under pressure stored in the emergency reservoir 60 will flow therethrough. It will be appreciated that fluid stored in the emergency reservoir 60 will, at this instant, be at the previous maximum pressure attained by fluid in supply pipe 50, or the assumed value of one hundred fifty pounds. This fluid at one hundred fifty pounds from reservoir 60 supplied to one side of double check valve device 57, being greater than any pressure of fluid which could exist on the opposite side of said check valve device at this time due to dwindling supply pressure will displace valve element 103 and flow into the brake cylinder pipe 35, then to brake cylinder 21 to effect an emergency application of brakes on the hoisting drum 13.

When the pressure of fluid in the supply pipe 50 is again restored to a normal value above the one hundred twenty pounds, for chosen example, the driller may return the handle 146 on control valve device 66 to its "Safety" position to again connect pipe 65 to supply pipe 50, whereupon fluid under pressure from the latter will flow into the former and thence to the diaphragm chamber 115 in relay valve device 63. Relay valve device 63 will again assume position to disconnect pipe 64 from pipe 65' and connect this latter pipe to the atmosphere. Previously, the relay valve device 68 will have closed off the pipe 69 from the pipe 65 when pressure of fluid in its diaphragm chamber 115, connected to supply pipe 50, reached one hundred ten pounds, so that, at time of returning handle 146 in control valve device 66 to its "Safety" position, the whistle 67 will not sound. A pressure gauge 150 is provided arranged to indicate the pressure condition of fluid in the supply pipe 50 so that by observing same the driller may know when to terminate an emergency brake application.

Now should accidental reduction in pressure in the supply pipe 50 be so rapid as to defy action on the part of the driller to take the above necessary step to effect an intentional emergency brake application, same will be effected automatically. When pressure of fluid in supply pipe 50 drops below one hundred ten pounds, relay valve device 68 will respond, in manner previously described, to connect pipe 69 to pipe 65 to blow whistle 67. As failure of supply pressure continues and drops below some value such as eighty pounds the relay valve device 63 will respond automatically to connect emergency supply of fluid under pressure from reservoir 60 to pipe 65' hence to the brake cylinder device 21. The pressure of fluid in supply pipe 50 and hence pipe 65 may then drop to atmospheric pressure if a severe break in the pipe should exist, in which case the whistle would naturally cease to sound. However, should some pressure in supply pipe 50 be maintained, though below eighty pounds, it may be desirable to intentionally silence the whistle 67, and this may be accomplished by moving handle 146 in valve device 66 to its "Emergency Application" to vent pipe 65, supplying fluid under pressure to said whistle, to atmosphere. If handle 146 is in its "Emergency Application" position when pressure of fluid in supply pipe 50 is restored to normal, normal control of the brakes is reestablished by returning handle 146 in device 66 to "Safety" position as previously described. If, however, handle 146 in device 66 is allowed to remain in its "Safety" position during the automatic emergency brake application, i. e., pipe 65 remains connected to supply pipe 50, then as supply pressure is again built up, the relay valve device 63 will automatically respond to cut off pipe 64 from the pipe 65' and to vent the latter pipe to atmosphere when supply pressure is increased to eighty pounds. When supply pressure continues to increase to one hundred ten pounds the relay valve device 68, as before, cuts off pipe 69 from pipe 65 to terminate supply of fluid under pressure to the whistle 67.

Description Fig. 3

In the alternate arrangement of the control apparatus shown in Fig. 3, normal application of brakes on the draw works hoisting drum 13 may be effected in manner as aforedescribed through supply of fluid under pressure to the brake cylinder device 21 by operation of either the self-lapping control valve devices 24, 26 through the relay valve device 55, all of which are shown in outline in Fig. 3, slightly altered in general contour, and all of which operate as described in reference to Fig. 2. However, the arrangement shown in Fig. 3 differs from that shown in Fig. 2 in that the emergency portion of the control apparatus is adapted and arranged to employ a spring 155 for effecting emergency application of the brake on drum 13. Connection of brake cylinder device 21 with the brake band 15 is altered slightly to incorporate the spring 155. Piston rod 32 may be pivotally connected to one end of a brake cylinder lever 156. The opposite end of lever 156 may be pivotally connected at 157 to a fixed element 158 and the live end of brake band 15 connected at 159 to said lever intermediate its ends. Clockwise turning movement of lever 156 about pin 157, as viewed in the drawing, will effect tightening of band 15 about brake drum 16 attached to hoisting drum 13. Turning movement of lever 156 in the opposite direction will effect release of the brake. Degree of any normal brake application, as before, will depend upon the pressure of fluid supplied to pressure chamber 30 in brake cylinder device 21.

The emergency application spring 155 may encircle a rod 160 slidably mounted at its one end in a bore in a fixed element 161 and attached at its opposite end to a piston 162 slidably mounted within a cylinder 163 mounted on a fixed element 164. One end of spring 155 abuts fixed element 161 while its opposite end abuts an annular stop member 165 attached to rod 160. By maintaining fluid in a brake cylinder pressure chamber 166, at one side of piston 162 and connected to pipe 65' spring 155 is held in compression. During normal operation of the control apparatus, the piston 162 and rod 160 are so disposed as to hold spring 155 compressed between stop member 165 and fixed element 161. A groove 167 is formed in rod 160 intermediate its ends in which a pin 168 carried by lever 156 projects. The groove 167 is of sufficient width and length as to allow for movement of lever 156 during normal operation of the hoisting drum brake by the brake cylinder device 21. A shoulder 169 formed at one end of groove 167 is provided for engagement with pin 168 to transmit force to the lever 156 for effecting an emergency brake application as spring 155 is allowed to expand against member 165 when fluid under pressure is vented from brake cylinder pressure chamber 166. As was not true, therefore, in regard to operation of the emergency portion of the control apparatus shown in Fig. 2, an emergency brake application is effected by venting fluid under pressure from pipe 65' rather than supply thereto. This is provided for by changing two connections in the relay valve device 63; pipe 50 is connected to chamber 120, and pipe 64, previously connected to reservoir 60, is disconnected therefrom and opened to atmosphere. Now, as pressure of fluid in pipe 65 is normally maintained above eighty pounds, relay valve device 63 will maintain pipe 65', hence chamber 166 in brake cylinder device 163 pressurized, while, if pressure in pipe 65 drops below eighty pounds, relay valve device 63 will vent said chamber 166 to atmosphere via pipe 64 to effect an emergency brake application. Device 66, 68 and whistle 67 function as aforedescribed.

Summary

It will be seen now that I have provided fluid pressure control apparatus arranged to be associated with a draw works hoisting drum brake for controlling certain operations connected with a rotary drilling rig which will assure a substantially constant pressure of the drilling bit exerted against a given formation, thus eliminating the erratic and inefficient method previously employed. The control apparatus provides for flexibility of operation in handling drill pipe, casing, etc., in running in and out of the hole and comprises protection means for effecting an emergency application of brakes on the draw works hoisting drum, intentionally or automatically, should pressure of fluid from the normal source of supply accidentally reduce below a desirable value. Signal means in the form of a whistle is arranged for automatic operation upon such accidental reduction in supply pressure to indicate the condition to the driller. Means are provided whereby the signal may be intentionally rendered inoperable, if desired, when in operation and said means is so arranged that once the control apparatus is again set up for normal control, the signal means is automatically rendered operable.

Having now described the invention, what I claim as new and desire to secure by Letters Patent, is:

1. Apparatus for controlling application and release of fluid pressure controlled emergency brake means, said apparatus comprising a source of fluid under pressure, a first relay valve device adapted for control connection with said brake cylinder device and having a control chamber, said first relay valve device being responsive to variations in pressure of fluid in its control chamber above and below a certain value for effecting release and application, respectively, of said emergency brake means, a signal device rendered effective and ineffective responsively to receipt and termination of receipt, respectively, of fluid under pressure thereto, a second relay valve device having a delivery chamber constantly connected to said signal device, a supply chamber, and a control chamber constantly connected to said source, said second relay valve device being responsive to variations in pressure of fluid in its control chamber above and below a second certain value, higher than the first mentioned certain value, to disestablish and establish, respectively, fluid pressure connection between its delivery chamber and its supply chamber, and an operator's control valve device having a delivery chamber constantly open to the control chamber in said first relay valve device and to the supply chamber in said second relay valve device, said operator's control valve device being operable to connect its delivery chamber selectively to said source or to the atmosphere.

2. Apparatus for controlling operation of emergency brake means having a brake cylinder pressure chamber and being responsive to pressurization and de-pressurization of said brake cylinder pressure chamber to effect release and application, respectively, of a braking force, said apparatus comprising a source of fluid under pressure, a first relay valve device having a supply chamber constantly connected to said source of fluid under pressure, a delivery chamber adapted for constant connection with said brake cylinder pressure chamber, an exhaust chamber constantly open to the atmosphere, and also having a control chamber, said first relay valve device being responsive to variations in pressure of fluid in its control chamber above and below a certain value to connect its delivery chamber selectively to its supply chamber or to its exhaust chamber, respectively, a signal device rendered effective and ineffective responsively to receipt and termination of receipt, respectively, of fluid under pressure thereto, a second relay valve device having a delivery chamber constantly connected to said signal device, a supply chamber, and a control chamber constantly connected to said source, said second relay valve device being responsive to variations in pressure of fluid in its control chamber above and below a certain value, higher than the first mentioned certain value, to disestablish and establish, respectively, fluid pressure connection between its delivery chamber and its supply chamber, and an operator's control valve device having a delivery chamber constantly open to the control chamber in said first relay valve device and to the supply chamber in said second relay valve device, said operator's control valve device being operable to connect its delivery chamber selectively to said source or to atmosphere.

ROY R. STEVENS.

References Cited in the file of this patent

UNITED STATES PATENTS

| Number | Name | Date |
| --- | --- | --- |
| 989,460 | Westphal | Apr. 11, 1911 |
| 1,187,693 | Woolley | June 20, 1916 |
| 2,109,297 | McMurry et al. | Feb. 22, 1938 |
| 2,117,078 | Brauer | May 10, 1938 |
| 2,187,969 | Grau et al. | Jan. 23, 1940 |
| 2,211,890 | Farmer | Aug. 20, 1940 |
| 2,275,255 | Freeman | Mar. 3, 1942 |
| 2,282,615 | Spalding | May 12, 1942 |
| 2,366,310 | Boldt | Jan. 2, 1945 |
| 2,366,608 | Freeman | Jan. 2, 1945 |
| 2,515,946 | Cadman | July 18, 1950 |